United States Patent [19]

Gundersen et al.

[11] 4,356,596
[45] Nov. 2, 1982

[54] FISH CLEANING DEVICE FOR USE ON FISH CLEANING MACHINE

[75] Inventors: George Gundersen, Madla; Ewald Øien, Krokelvdalen; Ragnar Eide; Palmer Wersland, both of Stavanger; Kristian Borgersen, Hafrsfjord, all of Norway; Paul Kloster, deceased, late of Stavanger, Norway; by Ketil Johnsen, executor, Madla, Norway

[73] Assignee: Trio Engineering Ltd. A/S, Forus, Norway

[21] Appl. No.: 42,953

[22] Filed: May 29, 1979

[30] Foreign Application Priority Data

May 30, 1978 [NO] Norway ............................. 781875

[51] Int. Cl.³ ........................................... A22C 25/14
[52] U.S. Cl. ...................................................... 17/58
[58] Field of Search .............. 17/55, 58, 61, 66, 52, 17/54, 53

[56] References Cited

U.S. PATENT DOCUMENTS 2,917,772  12/1959  Schlichting ........................... 17/55
3,570,047  3/1971  Bartels ............................... 17/58 X

FOREIGN PATENT DOCUMENTS 84458  9/1971  Fed. Rep. of Germany .......... 17/58

Primary Examiner—Willie G. Abercrombie
Attorney, Agent, or Firm—Watson, Cole, Grindle & Watson

[57] ABSTRACT

A spear-like fish cleaning device for attachment to a fish cleaning machine which can be inserted through a throat cut in a fish and into its belly and thereafter operated to grip the alimentary canal of the fish so as to close it off and disconnect it from the anus, the spear-like fish cleaning device including an elongated shaft, a pair of clamping elements attached to the free end of the shaft, the clamping elements being pivotable towards and away from one another, and, optionally, a knife attached to the free end of the shaft. The elongated shaft may be hollow to allow liquid or gas to be passed into the fish or else the liquid or gas may be passed into the fish via a tube attached to the outside of the elongated shaft.

7 Claims, 7 Drawing Figures

1

FISH CLEANING DEVICE FOR USE ON FISH CLEANING MACHINE

BACKGROUND OF THE INVENTION

The present invention relates to an improved fish cleaning machine which includes a spear-like fish cleaning device adapted to be introduced into the belly of the fish through a cut in the throat portion of the fish (the so called throat cut) and along the inside of the belly wall.

In prior art fish cleaning machines, elements are provided to stretch the alimenatry canal of the fish so that it is torn to rupture, but it is never certain where the point of rupture will be and it is consequently a risk that the contents of the alimentary canal at such rupture will flow out and cause infection.

The object of the present invention is to provide a fish cleaning machine which can operate such that the lower end of the alimentary canal of the fish may be separated from the belly wall just adjacent the anus and so as to prevent damaging of the gastric contents during the cleaning operation, as well as to prevent infection of the fish meat and the fish viscera.

SUMMARY OF THE INVENTION

According to the present invention a fish cleaning machine is provided with a spear-like fish cleaning device, the free end of which, i.e., the end of the device which is introduced into the throat cut, includes clamping elements which are adapated to assist in separating the lower end of the alimentary canal from the belly wall adjacent the anus, by clamping (pinching) the canal adjacent the anus and either cutting the canal adjacent the anus or tearing it to rupture from the belly wall surrounding the anus. The operation of the clamping elements may be controlled mechanically or by computer means controlling also the other functions of the cleaning machine.

In addition to the clamping elements, the spear-like device may also carry a knife at its free end which will, through a swinging movement of the spear device, protrude through the belly wall adjacent or behind the anus.

Furthermore, it is suggested that the spear device be hollow and connected to a source of liquid such as water or gas such as air in order to inflate the fish belly to enhance the cleaning operation.

The invention and the operation thereof will be further understood by reference to the accompanying drawing taken with the ensuing discussion.

DETAILED DESCRIPTION OF THE PREFERRED EMBODIMENTS

Figure 1:
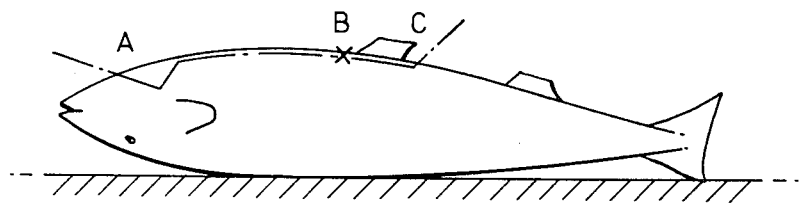
FIG. 1 shows a schematic side view of a fish and indicates by a dotted line the path of the free (leading) end of a fish cleaning spear device during the cleaning operation.

In FIG. 1 the path of a fish cleaning spear device through a fish is shown schematically by means of a dotted line. The spear device is introduced at A through the so-called throat cut and is subsequently moved along the inside of the belly wall up to the anus, at B, and thereafter a shorter or longer distance, depending on the fish species, to a point C where the free end of the spear device is caused to protrude out through the belly.

Figure 2:
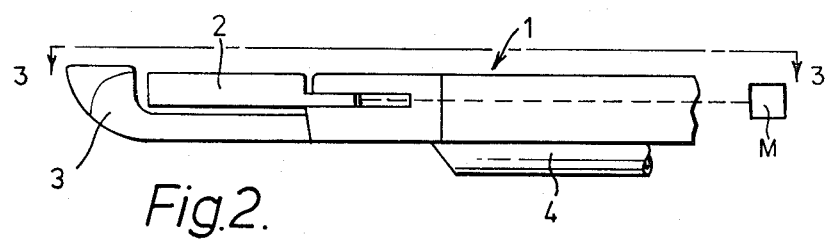
FIG. 2 shows a schematic side view of the free end of a spear-like cleaning device constructed in accordance with one embodiment of the present invention.
Figure 3:
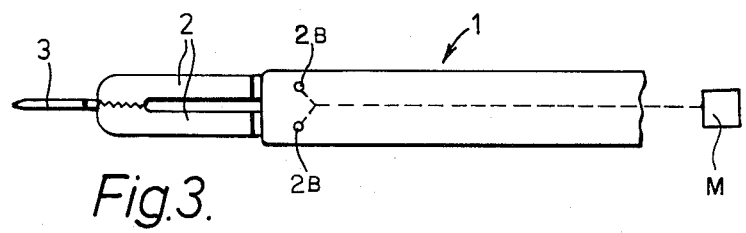
FIGS. 3 and 4 show plan views as seen along line 3—3 of FIG. 2, which the clamping elements of the cleaning spear device respectively in biting and non-biting positions.
Figure 4:
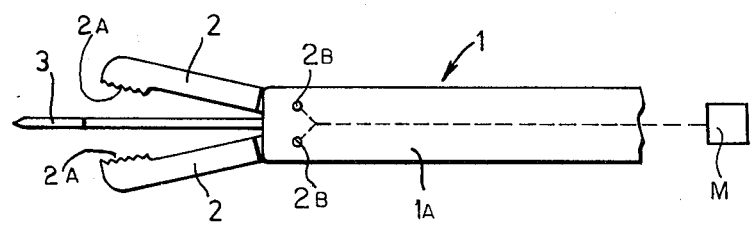

The spear device 1, one embodiment of which is shown in FIGS. 2 to 4, is mounted on a fish cleaning machine (not shown) and constitutes merely one of several tools for handling the fish in the machine. During the cleaning operation, the fish is normally moved belly up and head first towards the free or leading end of the cleaning spear device 1.

The spear device 1 includes an elongated shaft 1A, the free end of which mounts a pair of clamping elements 2, these elements 2 including serrated clamping surfaces 2A. The clamping elements, which are pivotable about pivots 2B by means M, serve to assist in separating the lower end of the alimentary canal of the fish from the anus. Furthermore, at its free end the spear device 1 carries a knife 3 adapted to cut through the belly wall from the inside thereof when the fish has moved so far through the machine that the spear device end has passed the anus. The knife 3 is oriented to extend perpendicularly to the plane in which the clamping elements 2 pivot towards and away from one another.

Figure 5:
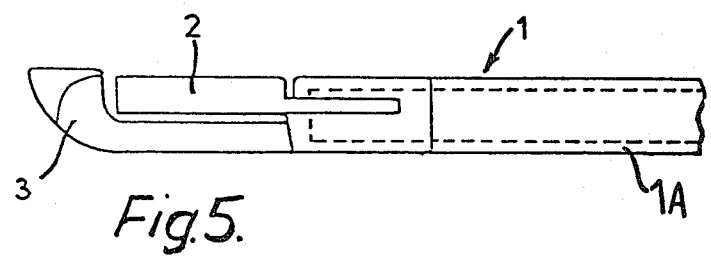
FIG. 5 shows a schematic side view of a spear-like cleaning device constructed in accordance with another embodiment of the present invention.

As shown in FIG. 5, the shaft 1A of the spear device 1 may be hollow, or as shown in FIG. 2 is may carry an external tube or the like 4, the tube 4 being connected to a source of fluid medium, i.e., liquid (e.g. water) or gas (e.g. air).

In operation the free or leading end of the spear device 1 is directed into the so-called throat cut at A in FIG. 1, optionally somewhat obliquely downwards, the throat cut having been made immediately prior to the spear device introduction by means of another tool (not shown) of the cleaning machine. During the phase of introducing the spear device, the clamping elements 2 are closed or merely slightly open by means M. When the leading end of the tube 4 has entered the belly, the spear device per se being close to the inside of the belly wall, the supply of liquid or gas through the tube 4 is opened, and thus the belly of the fish will be "inflated" so that the relative movement between the fish and the spear device end is made easier. During the continued relative movement between the fish and the spear device, the belly wall is cut open lengthwise of the fish by means of a further tool (not shown), e.g. a circular knife, which may use part of the spear device inside of the leading end as abutment. As the anus of the fish approaches the clamping elements 2, the clamping elements are operated by means M so as to open and subsequently close to grip the lower end of the alimentary canal as near to the anus as possible. Due to this grip on the alimentary canal thus achieved, the latter will be torn off from the anus, and thus there will be no leakage of canal contents which would otherwise contaminate (infect) the fish mean or the viscera. On continued relative movement between the fish and the spear device so that the leading spear device end lies a certain distance depending on the fish specie and size, behind the anus, the spear device end is tilted upwards whereby the knife 3 at the leading spear device end cuts through the belly wall.

When using the clamping elements 2 the entire alimentary canal may be removed from the abdominal cavity, the clamping elements being kept closed until after the spear device end has cut through the belly wall.

Figure 6:
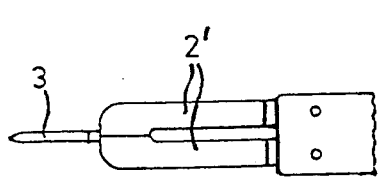
FIGS. 6 and 7 show plan views of the free end of a further construction of inventive spear-like cleaning device, FIG. 6 corresponding with FIG. 3 and FIG. 7 with FIG. 4.
Figure 7:
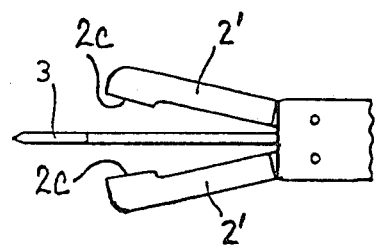

FIGS. 6 and 7 show another embodiment wherein the clamping elements 2' have smooth clamping surfaces 2C. Using this device the lower end of the alimentary canal may indeed be separated from the anus close to the latter, but the alimentary canal may not be withdrawn from the abdominal cavity.

The movement of the spear device into and out of the abdominal cavity, at A and C (FIG. 1) respectively and the closing of the clamping elements at B (FIG. 1) may be controlled by mechanical means M or by electronic means which do also control the other functions of the cleaning machine. These mechanical or electronic means do not, however, constitute part of the present invention and are consequently not further described.

We claim:

1. A spear-like cleaning device for use on a fish cleaning machine that can be introduced into the belly of the fish through a cut in the throat portion of the fish and along the inside of the belly, the spear-like cleaning device including an elongated shaft, a pair of clamping elements which are each pivotally connected to the free end of said elongated shaft, and means connected to said clamping elements to cause them to pivot towards and away from one another such that once the spear-like device has been inserted into the fish, the clamping elements can be operated such that the intestine of the fish can be gripped and then separated from the belly wall near the outlet opening of the intestine.

2. A spear-like cleaning device as defined in claim 1 wherein said free end of said elongated shaft includes a knife capable of cutting through the belly wall of a fish.

3. A spear-like cleaning device as defined in claim 2 wherein said knife is oriented to extend perpendicularly to the plane in which said clamping elements pivot towards and away from one another.

4. A spear-like cleaning device as defined in claim 2 wherein a hollow tube mounted on said elongated shaft through which a fluid medium can flow to inflate a fish when the spear-like device is inserted therein.

5. A spear-like cleaning device as defined in claim 2 wherein said elongated shaft is hollow.

6. A spear-like cleaning device as defined in claim 1 wherein said clamping elements each include serrated clamping surfaces.

7. A spear-like cleaning device as defined in claim 1 wherein said clamping elements each include smooth clamping surfaces.

* * * * *